(12) United States Patent
Lavid Ben Lulu et al.

(10) Patent No.: US 12,524,293 B2
(45) Date of Patent: *Jan. 13, 2026

(54) SYSTEM AND METHOD FOR UNSUPERVISED PREDICTION OF MACHINE FAILURES

(71) Applicant: Aktiebolaget SKF, Gothenburg (SE)

(72) Inventors: David Lavid Ben Lulu, Nesher (IL); Eitan Vesely, Kfar-Vradim (IL)

(73) Assignee: Aktiebolaget SKF, Gothenburg (SE)

( * ) Notice: Subject to any disclaimer, the term of this patent is extended or adjusted under 35 U.S.C. 154(b) by 1169 days.

This patent is subject to a terminal disclaimer.

(21) Appl. No.: 17/465,340

(22) Filed: Sep. 2, 2021

(65) Prior Publication Data
US 2021/0397501 A1 Dec. 23, 2021

Related U.S. Application Data

(63) Continuation of application No. 16/006,348, filed on Jun. 12, 2018, now Pat. No. 11,138,056, which is a
(Continued)

(51) Int. Cl.
*G06F 11/07* (2006.01)
*G05B 19/418* (2006.01)
(Continued)

(52) U.S. Cl.
CPC .......... *G06F 11/079* (2013.01); *G05B 19/418* (2013.01); *G05B 23/024* (2013.01);
(Continued)

(58) Field of Classification Search
CPC .............. G06F 11/079; G06F 11/0721; G05B 19/418; G05B 23/024; G05B 2219/32371;
(Continued)

(56) References Cited

U.S. PATENT DOCUMENTS 5,566,092 A 10/1996 Wang et al.
6,167,318 A 12/2000 Kizer et al.
(Continued)

FOREIGN PATENT DOCUMENTS

WO 2002018879 A1 3/2002
WO 2014145977 A1 9/2014
WO 2015104691 A3 11/2015

OTHER PUBLICATIONS

The International Search Report and The Written Opinion for PCT/US2016/065115, ISA/RU, Moscow, Russia, Date of Mailing: Mar. 16, 2017.
(Continued)

*Primary Examiner* — Christopher W Carter
(74) *Attorney, Agent, or Firm* — M&B IP Analysts, LLC (57) ABSTRACT

A system and method for unsupervised prediction of machine failures. The method includes monitoring sensory inputs related to at least one machine; analyzing, via at least unsupervised machine learning, the monitored sensory inputs, wherein the output of the unsupervised machine learning includes at least one indicator; identifying, based on the at least one indicator, at least one pattern; and determining, based on the at least one pattern and the monitored sensory inputs, at least one machine failure prediction.

19 Claims, 7 Drawing Sheets

Related U.S. Application Data continuation of application No. PCT/US2016/065115, filed on Dec. 6, 2016.

(60) Provisional application No. 62/274,296, filed on Jan. 3, 2016.

(51) Int. Cl.
  *G05B 23/02* (2006.01)
  *G06N 20/00* (2019.01)
  *G07C 3/00* (2006.01)

(52) U.S. Cl.
  CPC ......... *G06F 11/0721* (2013.01); *G06N 20/00* (2019.01); *G07C 3/00* (2013.01); *G05B 2219/32371* (2013.01)

(58) Field of Classification Search
  CPC ........... G05B 2219/31357; G05B 2219/34447; G05B 19/4184; G06N 20/00; G07C 3/00
  See application file for complete search history.

(56) References Cited

U.S. PATENT DOCUMENTS

| | | | |
|---|---|---|---|
| 6,343,261 B1 | 1/2002 | Iwanowski et al. | |
| 6,983,210 B2 | 1/2006 | Matsubayashi et al. | |
| 6,993,417 B2 | 1/2006 | Osann | |
| 7,276,915 B1 | 10/2007 | Euler et al. | |
| 7,317,404 B2 | 1/2008 | Cumeralto et al. | |
| 7,346,433 B2 | 3/2008 | Budike | |
| 7,423,546 B1 | 9/2008 | Aisa | |
| 7,451,017 B2 | 11/2008 | McNally | |
| 7,460,930 B1 | 12/2008 | Howell et al. | |
| 7,463,986 B2 | 12/2008 | Hayes | |
| 7,605,698 B2 | 10/2009 | Moriwaki | |
| 7,840,383 B2 | 11/2010 | Wang | |
| 8,019,501 B2 | 9/2011 | Breed | |
| 8,255,090 B2 | 8/2012 | Frader-Thompson et al. | |
| 8,275,576 B2 | 9/2012 | Furem et al. | |
| 8,468,380 B2 | 6/2013 | Munjal et al. | |
| 8,644,166 B2 | 2/2014 | Xia et al. | |
| 8,649,987 B2 | 2/2014 | Steenberg et al. | |
| 8,655,441 B2 | 2/2014 | Fletcher et al. | |
| 8,665,061 B2 | 3/2014 | Kagan et al. | |
| 10,295,995 B2 | 5/2019 | Hiruta et al. | |
| 10,311,356 B2 | 6/2019 | Gu et al. | |
| 10,599,982 B2 | 3/2020 | Pal et al. | |
| 2002/0091972 A1 | 7/2002 | Harris et al. | |
| 2007/0271014 A1 | 11/2007 | Breed | |
| 2007/0289013 A1* | 12/2007 | Lim | G06F 21/552 726/22 |
| 2008/0133518 A1 | 6/2008 | Kapoor et al. | |
| 2009/0006295 A1 | 1/2009 | Angell et al. | |
| 2011/0035338 A1 | 2/2011 | Kagan et al. | |
| 2012/0290879 A1 | 11/2012 | Shibuya et al. | |
| 2013/0060524 A1 | 3/2013 | Liao | |
| 2015/0313529 A1 | 11/2015 | Nevo et al. | |
| 2016/0078367 A1 | 3/2016 | Adjaoute | |
| 2017/0091870 A1* | 3/2017 | Trainor | G08B 13/08 |
| 2017/0284896 A1* | 10/2017 | Harpale | G01M 15/14 |
| 2018/0348747 A1 | 12/2018 | Lulu et al. | |
| 2019/0391568 A1* | 12/2019 | Rashidi | G05B 13/0265 |

OTHER PUBLICATIONS

The International Search Report and The Written Opinion for PCT/US2017/012306, ISA/RU, Moscow, Russia, Date of Mailing: Apr. 20, 2017.

The International Search Report and The Written Opinion for PCT/US2017/012833, ISA/RU, Moscow, Russia, Date of Mailing: Apr. 13, 2017.

The International Search Report and Written Opinion of PCT/US2017/012708, ISA/RU, Moscow, Russia, Date of Mailing: Mar. 16, 2017.

* cited by examiner

SYSTEM AND METHOD FOR UNSUPERVISED PREDICTION OF MACHINE FAILURES

CROSS-REFERENCE TO RELATED APPLICATIONS

This application is a continuation of U.S. patent application Ser. No. 16/006,348 filed Jun. 12, 2018, which is in turn a continuation of International Application No. PCT/US2016/065115 filed Dec. 6, 2016 which claims the benefit of U.S. Provisional Application No. 62/274,296 filed on Jan. 3, 2016, the entire contents of all of the foregoing are hereby incorporated by reference.

TECHNICAL FIELD

The present disclosure relates generally to maintenance systems for machines, and more specifically to monitoring machine operations for improving machine processes.

BACKGROUND

Communications, processing, cloud computing, artificial intelligence, and other computerized technologies have advanced significantly in recent years, heralding in new fields of technology and production. Further, many of the industrial technologies employed since or before the 1970s are still used today. Existing solutions related to these industrial technologies have typically seen minor improvements, thereby increasing production and yield only slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs when a machine deviates from correct service. Errors, which are typically deviations from the correct state of the machine, are not necessarily failures, but may lead to and indicate potential future failures. Besides failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450 megawatt power turbine, for example, a single day of downtime can cost a manufacturer over $3 million US in lost revenue. Such downtime may have additional costs related to repair, safety precautions, and the like.

In energy power plants, billions of US dollars are spent annually on ensuring reliability. Specifically, billions of dollars are spent on backup systems and redundancies utilized to minimize production downtimes. Additionally, monitoring systems may be utilized to identify failures quickly, thereby speeding up the return to production when downtime occurs. However, existing monitoring systems typically identify failures only after or immediately before downtime begins.

Further, existing solutions for monitoring machine failures typically rely on a set of predetermined rules for each machine. These rules sets do not account for all data that may be collected with respect to the machine, and may only be used for checking particular key parameters while ignoring the rest. Moreover, these rules sets must be provided in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination of failures.

Additionally, existing solutions often rely on periodic testing at predetermined intervals. Thus, even existing solutions that can predict failures in advance typically return requests to perform machine maintenance even when the machine is not in immediate danger of failing. Such premature replacement results in wasted materials and expenses spent replacing parts that are still functioning properly. Further, such existing solutions often determine failures only after failure occurs. As a result, such failures may not be prevented, resulting in down time and lost revenue.

Further, existing monitoring and maintenance solutions often require dedicated testing equipment. Consequently, these solutions typically require specialized operators who are well-trained in the operation of each monitoring and maintenance system. Requiring specialized operators can be inconvenient and costly, and may introduce potential sources of human error. Additionally, given the sheer amount of data that may be collected for any given machine in addition to minute fluctuations in data, a human analyst is not capable of adequately determining upcoming failures.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for unsupervised prediction of machine failures. The method comprises: monitoring sensory inputs related to at least one machine; analyzing, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data; identifying, based on the at least one indicator, at least one pattern; and determining, based on the at least one pattern and the monitored sensory inputs, at least one prediction of machine failure that will occur in the future; and selecting, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs; wherein each selected at least one unsupervised machine learning model is selected for at least one parameter represented by the preprocessed sensory inputs.

Certain embodiments disclosed herein also include a non-transitory computer readable medium having stored thereon instructions for causing a processing circuitry to perform a process, the process comprising: monitoring sensory inputs related to at least one machine; analyzing, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data; identifying, based on the at least one indicator, at least one pattern; and determining, based on the at least one pattern and the monitored sensory inputs, at least one prediction of machine failure that will occur in the future; and selecting, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs; wherein each selected at least one unsupervised machine learning model is selected for at least one parameter represented by the preprocessed sensory inputs.

Certain embodiments disclosed herein also include a system for unsupervised prediction of machine failures. The system comprises: a processing circuitry; and a memory, the memory containing instructions that, when executed by the processing circuitry, configure the system to: monitor sensory inputs related to at least one machine; analyze, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data; identify, based on the at least one indicator, at least one pattern; and determine, based on the at least one pattern and the monitored sensory inputs, at least one prediction of machine failure that will occur in the future; and select, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs; wherein each selected at least one unsupervised machine learning model is selected for at least one parameter represented by the preprocessed sensory inputs.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for unsupervised prediction of mechanical, electrical, or other failures that require maintenance. Various embodiments disclosed herein include identifying behavioral patterns of a machine via real-time monitoring of industrial data. At least sensory inputs associated with a machine are received from a plurality of sensors configured to capture data related to operation of the machine. The at least sensory inputs are analyzed via unsupervised machine learning to predict future failure of the machine, timings for machine maintenance, or both. The analysis may include comparing the sensory inputs to sensory inputs stored in a database.

The analysis may further include modeling the sensory inputs and detecting indicators in the sensory inputs. The modeling may include generating meta-models for each component or portion of the machine. The meta-models are monitored to detect indicators therein. Based on the indicators, machine failures may be predicted. In a further embodiment, machine maintenance times may be determined based on the predicted failures, the indicators, or both.

Figure 1:
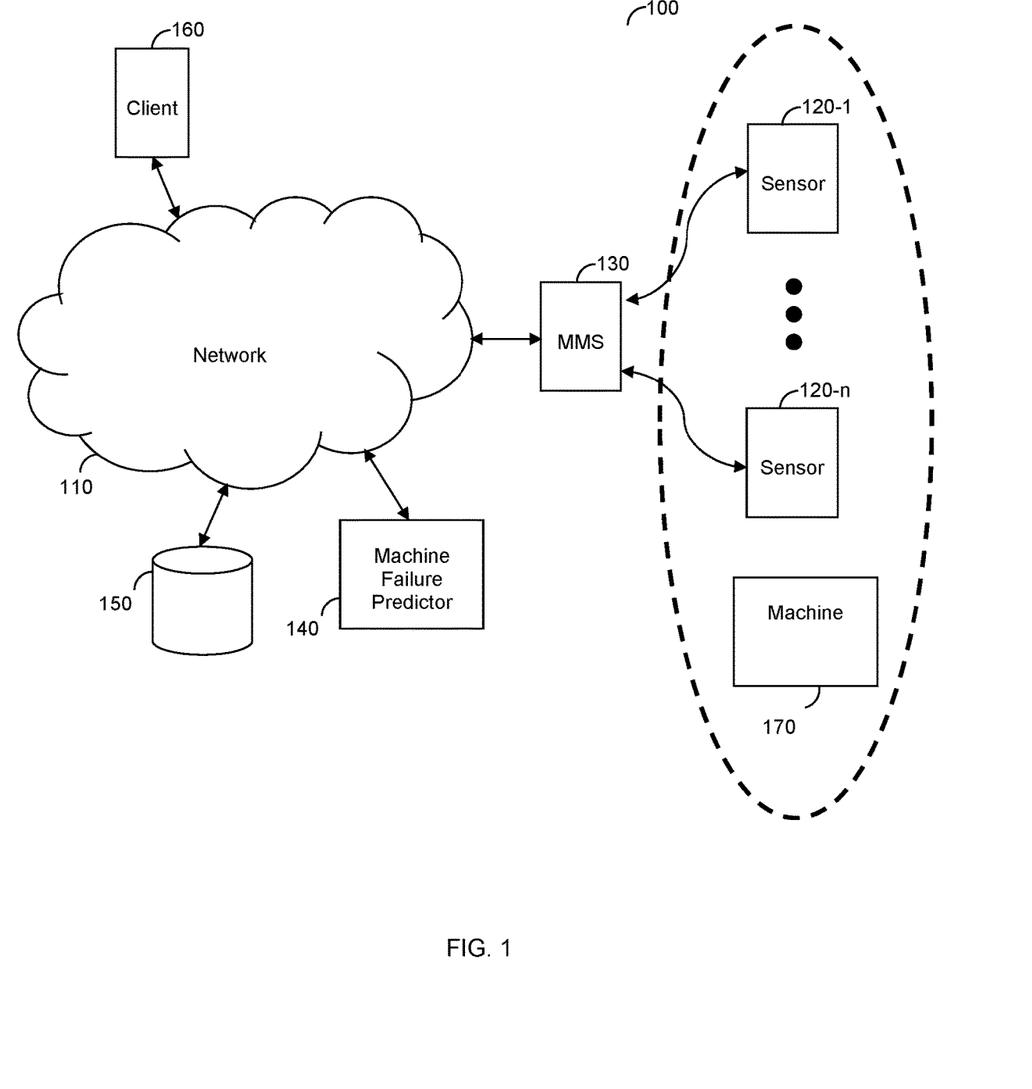
FIG. 1 is a network diagram utilized to describe the various disclosed embodiments.

FIG. 1 shows an example network diagram 100 utilized to describe the various disclosed embodiments. The example network diagram 100 includes a machine monitoring system (MMS) 130, a machine failure predictor 140, a database 150, and a client device 160 communicatively connected via a network 110. The example network diagram 100 further includes a plurality of sensors 120-1 through 120-n (hereinafter referred to individually as a sensor 120 and collectively as sensors 120, merely for simplicity purposes), communicatively connected to the machine monitoring system 130. The network 110 may be, but is not limited to, a wireless, a cellular or wired network, a local area network (LAN), a wide area network (WAN), a metro area network (MAN), the Internet, the worldwide web (WWW), similar networks, and any combination thereof.

The client device 160 may be, but is not limited to, a personal computer, a laptop, a tablet computer, a smartphone, a wearable computing device, or any other device capable of receiving and displaying notifications indicating maintenance and failure timing predictions, results of unsupervised analysis of machine operation data, or both.

The sensors 120 are located in proximity (e.g., physical proximity) to a machine 170. The machine 170 may be any machine for which performance can be represented via sensory data such as, but not limited to, a turbine, an engine, a welding machine, a three dimensional (3D) printer, an injection molding machine, a combination thereof, a portion thereof, and the like. Each sensor 120 is configured to collect sensory inputs such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be, but are not necessarily, communicatively or otherwise connected to the machine 170 (such connection is not illustrated in FIG. 1 merely for the sake of simplicity and without limitation on the disclosed embodiments).

The sensors 120 are communicatively connected to the machine monitoring system 130. The machine monitoring system 130 may be configured to store and to preprocess sensory inputs received from the sensors 120. Alternatively or collectively, the machine monitoring system 130 may be configured to periodically retrieve collected sensory inputs stored in, for example, the database 150. The preprocessing may include, but is not limited to, timestamping sensory inputs, de-trending, rescaling, noise filtering, a combination thereof, and the like.

The preprocessing may further include feature extraction. The results of the feature extraction may include features to be utilized by the machine failure predictor 140 during unsupervised machine learning in order to detect indicators. The feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in, e.g., a lower-dimensional space for the sensory inputs. The machine monitoring system 130 is configured to send the preprocessed sensory inputs to the machine failure predictor 140.

In an embodiment, the machine failure predictor 140 is configured to receive, via the network 110, the preprocessed sensory inputs associated with the machine 170 from the machine monitoring system 130. The sensory inputs may be received continuously, and may be received in real-time.

In an embodiment, the machine failure predictor 140 may further store the sensory input data received from the machine monitoring system 130. Alternatively or collectively, the sensory input data may be stored in the database 150. The database 150 may further store sensory inputs (raw, preprocessed, or both) collected from a plurality of other sensors (not shown) associated with other machines (also not shown). The database 150 may further store indicators, anomalous patterns, failure predictions, behavioral models utilized for analyzing sensory input data, or a combination thereof.

In an embodiment, the machine failure predictor 140 is configured to analyze the preprocessed sensory inputs. The analysis may include, but is not limited to, unsupervised machine learning. In a further embodiment, the unsupervised machine learning may include one or more signal processing techniques, implementation of one or more neural networks, or both. It should be noted that different parameters represented by the sensory inputs may be analyzed using different machine learning techniques. For example, a temperature parameter may be analyzed by applying a first machine learning technique to sensory inputs from a temperature sensor, and an energy consumption parameter may be analyzed by applying a second machine learning technique to sensory inputs from an energy consumption gage.

In an embodiment, the machine failure predictor 140 may be configured to automatically select at least one optimal method for detecting indicators in the sensory input data based on, e.g., a type of one or more portions of the data. In a further embodiment, the selection may be based on results from applying a plurality of models to each at least a portion of the sensory input data. In yet a further embodiment, the selection may be based further on a number of false positives in the results.

In a further embodiment, the machine failure predictor 140 is configured to generate a meta-model based on at least one portion of the machine 170. Each portion of the machine for which a meta-model is generated may be a component (not shown) such as, but not limited to, a pipe, an engine, a portion of an engine, a combination thereof, and the like. Generating a meta-model may include, but is not limited to, selecting a model that optimally indicates anomalies in the sensory inputs for each of the at least one portion of the machine 170. Each of the generated meta-models is utilized to detect anomalies in the behavior of the respective portion of the machine 170.

In an embodiment, the machine failure predictor 140 is configured to generate, in real-time, at least one adaptive threshold for detecting anomalies based on the analysis. In a further embodiment, the machine failure predictor 140 is configured to determine, in real-time, normal behavior patterns for the sensory inputs of the machine 170 or each portion thereof. The adaptive thresholds may be generated based on the determined normal behavior patterns. Generation of adaptive thresholds for detecting anomalies based on normal behavior patterns is described further herein below with respect to FIGS. 3A and 3B.

In an embodiment, based on the detected anomalies, suspected errors may be determined. In a further embodiment, when a suspected error is determined, the machine failure predictor 140 may be configured to generate a notification indicating anomalous activity. In a further embodiment, the machine failure predictor 140 is further configured to send the generated notification to, e.g., the user device 160. Alternatively or collectively, the machine failure predictor 140 may be configured to send the notification to a system (not shown) configured to automatically mitigate failures.

It should be noted that the machine monitoring system 130 is shown in FIG. 1 as a separate component from the machine failure predictor 140 merely for simplicity purposes and without limitation on the disclosed embodiments. The machine monitoring system 130 may be incorporated in the machine failure predictor 140 so as to allow the machine failure predictor 140 to obtain and preprocess sensory inputs without departing from the scope of the disclosure.

It should also be noted that the embodiments described herein above with respect to FIG. 1 are discussed with respect to a user device 160 and a machine 170 merely for simplicity purposes and without limitation on the disclosed embodiments. Multiple user devices may receive information related to machine maintenance and failures without departing from the scope of the disclosure. Additionally, sensory inputs related to multiple machines may be collected to determine failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the machine failure predictor 140 may reside in the cloud computing platform, a datacenter, on premise, and the like. Moreover, in an embodiment, there may be a plurality of management servers operating as described hereinabove and configured to either have one as a standby proxy to take control in a case of failure, to share the load between them, or to split the functions between them.

Figure 2:
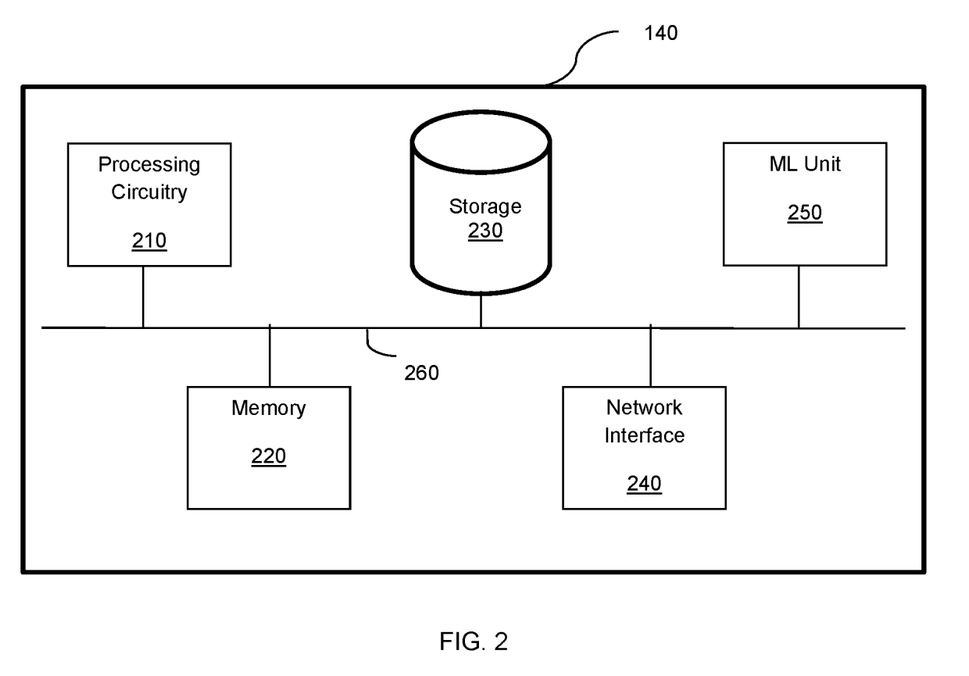
FIG. 2 is a schematic diagram of a machine failure predictor system according to an embodiment.

FIG. 2 shows an example block diagram of the machine failure predictor 140 implemented according to one embodiment. The machine failure predictor 140 includes a processing circuitry 210 coupled to a memory 220, a storage 230, a network interface 240, and a machine learning (ML) unit 250. In an embodiment, the components of the machine failure predictor 140 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform predictions of machine maintenance as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the machine failure predictor 140 to communicate with the machine monitoring system 130 for the purpose of, for example, receiving preprocessed sensory inputs. Additionally, the network interface 240 allows the machine failure predictor 140 to communicate with the user device 160 in order to send, e.g., notifications related to anomalous activity.

The machine learning unit 250 is configured to perform unsupervised machine learning based on sensory inputs received via the network interface 240 as described further herein. In an embodiment, the machine learning unit 250 is further configured to determine, based on the unsupervised machine learning, predictions for failures of the machine 170. In a further embodiment, the machine learning unit 250 is also configured to determine at least one recommendation for avoiding or mitigating the determined predicted failures. As a non-limiting example, the at least one recommendation may indicate that an exhaust pipe on the machine 170 should be replaced with a new exhaust pipe to avoid failure.

It should be understood that the embodiments described herein are not limited to the specific architecture illustrated in FIG. 2, and other architectures may be equally used without departing from the scope of the disclosed embodiments.

Figure 3A:
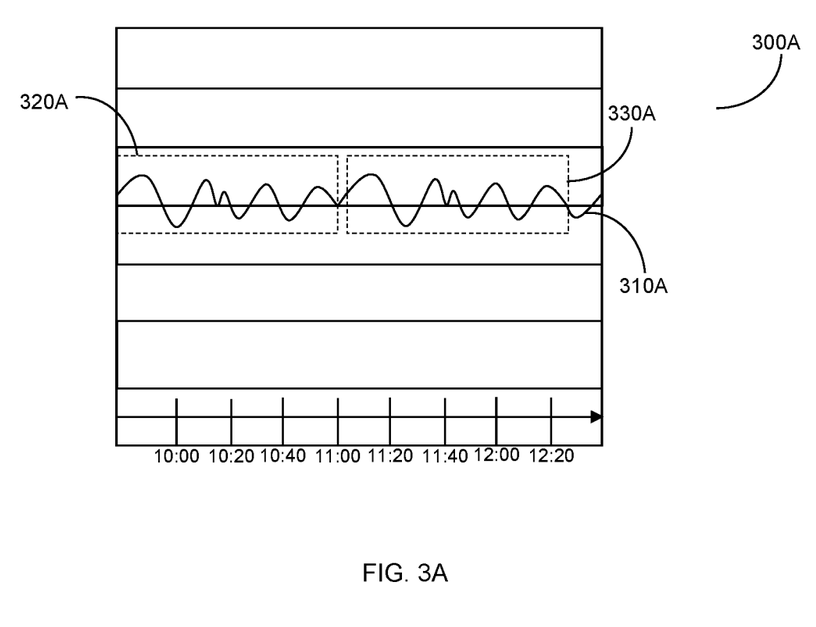
FIGS. 3A and 3B are simulations illustrating modeling of sensory inputs.

FIG. 3A is an example simulation illustrating determining behavioral patterns implemented according to an embodiment. The simulation shown in FIG. 3A includes a graph 300A in which sensory inputs are represented by a curve 310A. In the example simulation shown in FIG. 3, the curve 310A represents an aggregated behavior of the sensory inputs over time. During operation of a machine (e.g., the machine 170, FIG. 1), the aggregated behavior represented by the curve 310A may be continuously monitored for repeated sequences such as repeated sequences 320A and 330A. Upon determination of, for example, the repeated sequence 320A, the repeated sequence 330A, or both, a model of a normal behavior pattern of the machine is generated. It should be noted that continuous monitoring of, e.g., two or more cycles of behavior may be useful for determining more accurate patterns. As monitoring and, consequently, learning, continue, the normal behavior model may be updated accordingly. The models of normal behavior patterns may be utilized to determine machine failure predictions. As a non-limiting example, if the sequence 320A preceded a machine failure, then the determination of repeated sequence 330A may be predicted to precede a machine failure.

Figure 3B:
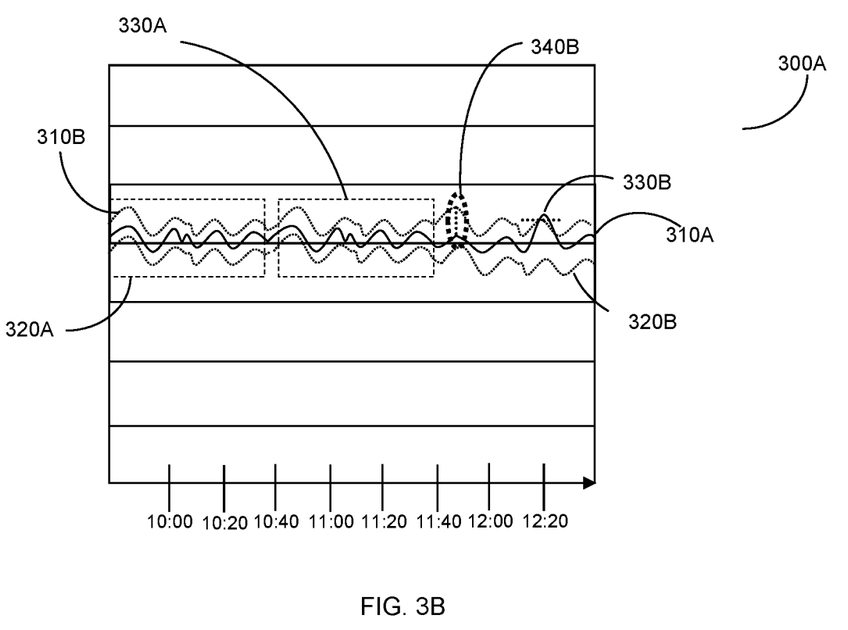

FIG. 3B is an example simulation 300B illustrating generation of adaptive thresholds. Based on one or more repeated sequences (e.g., the repeated sequences 320A and 330A), a maximum threshold 310B and a minimum threshold 320B are determined. The thresholds 310B and 320B may be determined in real-time and regardless of past machine behavior. In an example implementation, the thresholds 310B and 320B are dynamic and adapted based on the sequences 320A and 330A as well as any subsequently determined sequences. The point 330B represents an indicator, i.e., a data point that is above the maximum threshold 310B or below the minimum threshold 320B. Upon determination that one of the thresholds 310B or 320B has been exceeded, an anomaly may be detected.

Figure 4:
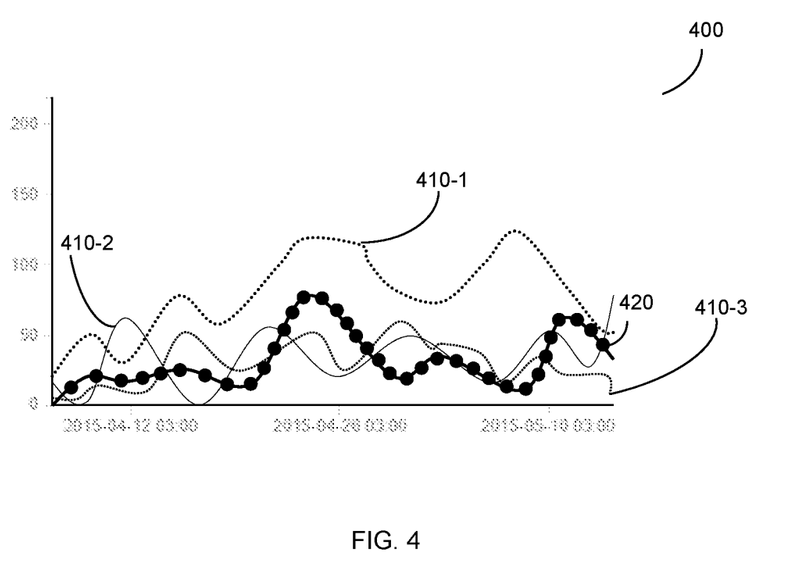
FIG. 4 is a simulation illustrating a general model of a plurality of meta-models.

FIG. 4 is an example simulation 400 illustrating generating a model of a machine based on a plurality of meta-models. In the example simulation 400, a machine (e.g., the machine 170) including three components is being monitored, where the three components are represented by the meta-models 410-1, 410-2, and 410-3, respectively. The meta-models are based on sensory inputs related to their respective components, and may be utilized to identify anomalies in the operation of each respective component of the machine. Based on the meta-models 410-1 through 410-3, a model 420 that is an optimal representation of the machine may be generated.

Figure 5:
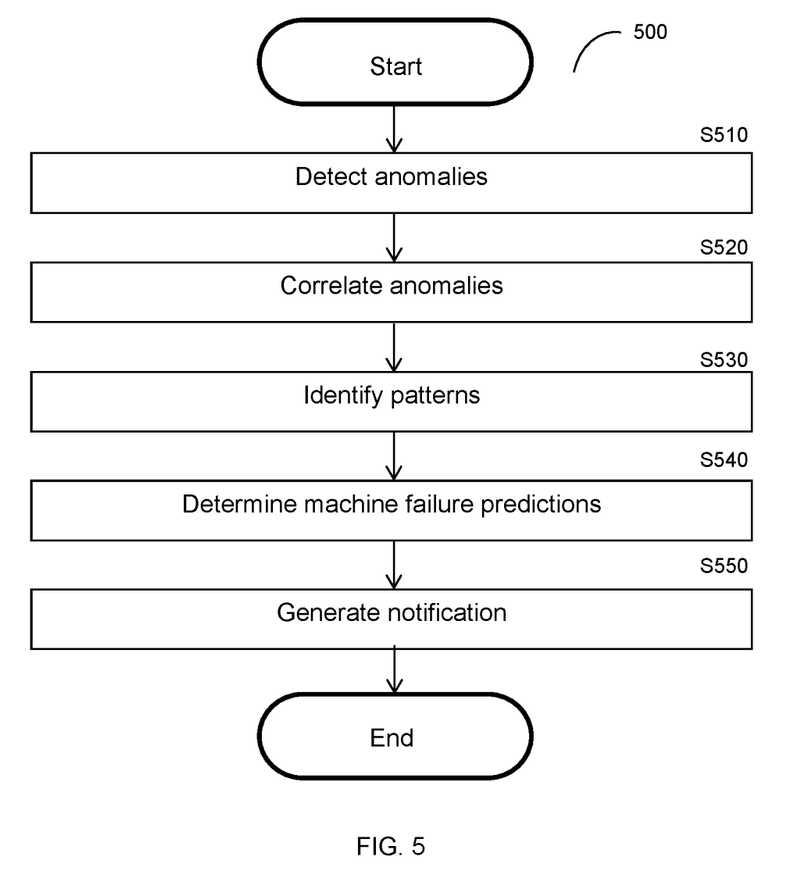
FIG. 5 is a flowchart illustrating a method for predicting machine failures according to an embodiment.

FIG. 5 is an example flowchart 500 illustrating a method for unsupervised prediction of machine failures according to an embodiment. In an embodiment, the method may be performed by the machine failure predictor 140.

At S510, sensory inputs related to a machine (e.g., the machine 170) are monitored and analyzed to detect anomalies. The analysis may include, but is not limited to, unsupervised machine learning using preprocessed sensory inputs. The outputs of the unsupervised machine learning process include anomalies. In a further embodiment, S510 may include generating a periodic anomalies map of the detected anomalies. Detecting anomalies based on sensory inputs is described further herein below with respect to FIG. 6.

At S520, the detected anomalies are correlated. In an embodiment, the detected anomalies may be correlated with respect to each type of sensory input. In a further embodiment, S520 may further include ranking correlated groups of sensory inputs. In another embodiment, S520 may include applying a correlation function using a correlation coefficient such as, but not limited to, the Pearson correlation coefficient, the Kendal correlation coefficient, or the Spearman correlation coefficient.

At S530, patterns in the correlated anomalies are identified. Identifying the patterns may include, but is not limited to, identified at least one anomalous sequence for each type of sensory input. Each identified anomalous sequence is a sequence that includes a plurality of anomalies and is repeated at least once in the correlated anomalies.

At S540, at least one machine failure prediction is determined. The at least one machine failure prediction may be a prediction of failure of the machine or of any portion thereof (e.g., a component of the machine). In an embodiment, the failures are predicted based on similar patterns of, e.g., anomalies. In a further embodiment, S540 may further include determining a required maintenance time that is before the predicted failure time. The determined required maintenance time may be utilized to, e.g., generate a recommendation for avoiding or mitigating failure, where the recommendation indicates the latest time at which the recommendation should be implemented.

At S550, a notification is generated. The notification may indicate, e.g., the at least one machine failure prediction, the determined required maintenance time, or both. The notification may be sent to a client device, or may be sent to a system configured to automatically perform maintenance on the machine or a portion thereof.

Figure 6:
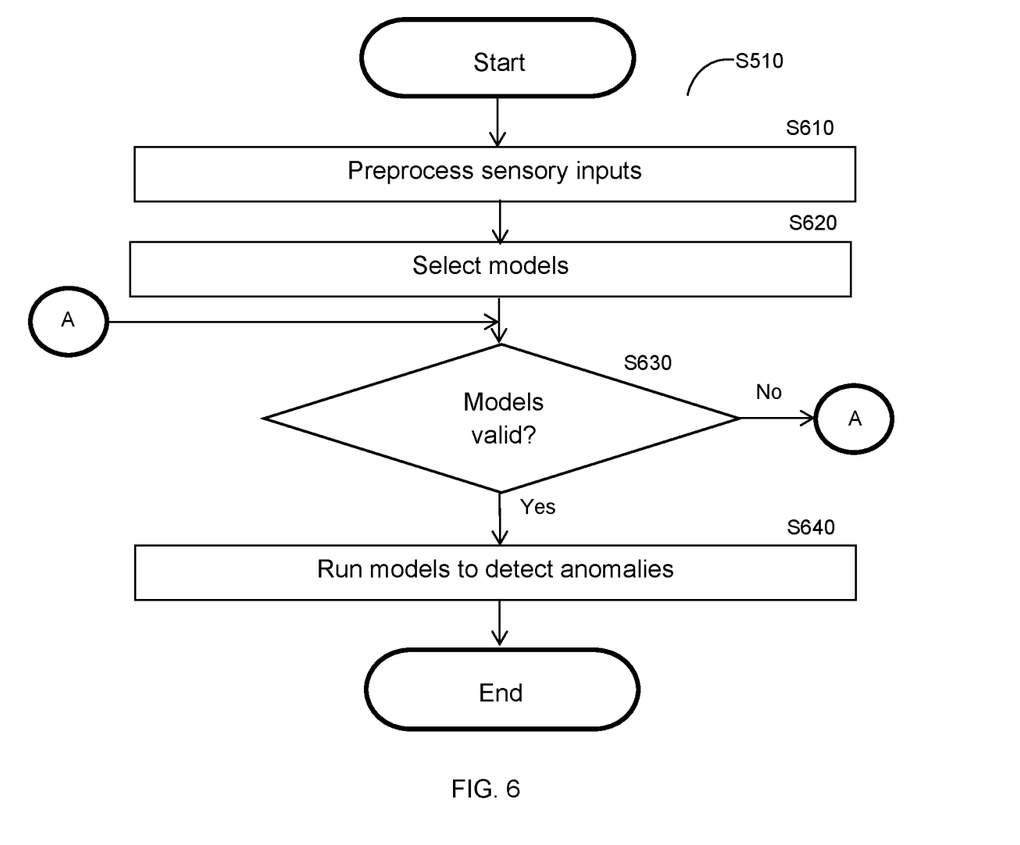
FIG. 6 is a flowchart illustrating a method for unsupervised detection of anomalies according to an embodiment.

FIG. 6 is an example flowchart S510 illustrating a method for detecting anomalies based on sensory inputs according to an embodiment.

At S610, sensory inputs from at least one sensor associated with a machine are preprocessed. In an embodiment, S610 may further include retrieving raw sensory data, and extracting features from the raw sensory data. The extracted features may include, but are not limited to, a reduced-dimension subset of the raw sensory data. In another embodiment, S610 may further include de-trending, rescaling, noise filtering, or a combination thereof.

At S620, at least one model is selected. Each model is selected for one of the parameters represented by the preprocessed sensory inputs. Selecting the models may include computing optimization of models for each parameter.

At optional S630, it may be determined whether the selected models are validated and, if so, execution continues with S640; otherwise, execution continues with S620. In an embodiment, S630 may include injecting randomized anomalies into a dataset, running each selected model using the dataset with the injected randomized anomalies, and calculating accuracy measures based on the injected anomalies run of each model.

At S640, the selected models are run and monitored to detect anomalies. In an embodiment, S640 may include generating an anomalies map. In an embodiment, S640 may further include generating at least one normal behavior pattern based on the running of the selected models. The normal behavior models utilized to generate the anomalies map may be created as described further herein above with respect to FIGS. 3A-3B and 4. In another embodiment, S640 may further include generating, in real-time, at least one adaptive threshold. The generated adaptive thresholds may be utilized to determine anomalous data points.

The detected anomalies may include, but are not limited to, point anomalies, contextual anomalies, and collective anomalies. Point anomalies include a single data point that is above or below a threshold (e.g., an adaptive threshold as described herein above with respect to FIGS. 3A and 3B) difference with respect to all other data points. A contextual anomaly includes one or more data points that deviate from normal behavior within a given context (e.g., a particular period of time). A collective anomaly includes a plurality of data points that deviate from normal behavior of other groupings of data points.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for unsupervised prediction of machine failures, comprising:
   monitoring sensory inputs related to at least one machine;
   analyzing, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data;
   identifying, based on the at least one indicator, at least one pattern; and
   determining, based on the at least one pattern and the monitored sensory inputs, at least one prediction of machine failure that will occur in the future; and
   selecting, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs;
   wherein each selected at least one unsupervised machine learning model is selected for at least one parameter represented by the preprocessed sensory inputs.

2. The method of claim 1, further comprising:
   correlating, for each type of sensory input of the monitored sensory inputs, at least one of the at least one indicator, wherein the at least one pattern is identified further based on the correlation.

3. The method of claim 1, further comprising:
   determining, based on the at least one machine failure prediction, at least one required maintenance time.

4. The method of claim 3, further comprising:
   generating, based on the at least one machine failure prediction, at least one recommendation for avoiding or mitigating failure.

5. The method of claim 4, further comprising:
   generating a notification, wherein the notification indicates the at least one of: the at least one machine failure prediction, the at least one required maintenance time, and the at least one recommendation.

6. The method of claim 1, wherein analyzing the monitored sensory inputs further comprises:
   preprocessing the monitored sensory inputs, wherein the preprocessing includes extracting at least one feature raw sensory data.

7. The method of claim 1, wherein the at least one machine failure prediction is a prediction of a future failure of the machine.

8. The method of claim 1, further comprising:
   generating, based on the at least one indicator, an anomalies map.

9. The method of claim 1, further comprising:
   generating, based on the running of the selected at least one unsupervised machine learning model, at least one normal behavior pattern.

10. A non-transitory computer readable medium having stored thereon instructions for causing a processing circuitry to perform a process, the process comprising:
    monitoring sensory inputs related to at least one machine;
    analyzing, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data;
    identifying, based on the at least one indicator, at least one pattern; and
    determining, based on the at least one pattern and the monitored sensory inputs, at least one prediction of machine failure that will occur in the future; and
    selecting, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs;
    wherein each selected at least one unsupervised machine learning model is selected for at least one parameter represented by the preprocessed sensory inputs.

11. A system for unsupervised prediction of machine failures, comprising:
    a processing circuitry; and
    a memory, the memory containing instructions that, when executed by the processing circuitry, configure the system to:
    monitor sensory inputs related to at least one machine;
    analyze, via at least unsupervised machine learning, the monitored sensory inputs, wherein the output of the unsupervised machine learning includes at least one indicator, and wherein analyzing the monitored sensory inputs further comprises preprocessing the monitored sensory inputs, wherein the preprocessing includes extracting at least one feature raw sensory data;
    identify, based on the at least one indicator, at least one pattern; and
    determine, based on the at least one pattern and the monitored sensory inputs, at least one prediction of machine failure that will occur in the future; and
    select, based on the preprocessed sensory inputs, at least one unsupervised machine learning model from an available plurality of unsupervised machine learning models, wherein the unsupervised machine learning includes running the selected at least one unsupervised machine learning model using the preprocessed sensory inputs;
    wherein each selected at least one unsupervised machine learning model is selected for at least one parameter represented by the preprocessed sensory inputs.

12. The system of claim 11, wherein the system is further configured to:
    correlate, for each type of sensory input of the monitored sensory inputs, at least one of the at least one indicator, wherein the at least one pattern is identified further based on the correlation.

13. The system of claim 11, wherein the system is further configured to:
    determine, based on the at least one machine failure prediction, at least one required maintenance time.

14. The system of claim 13, wherein the system is further configured to:
    generate, based on the at least one machine failure prediction, at least one recommendation for avoiding or mitigating failure.

15. The system of claim 14, wherein the system is further configured to:
    generate a notification, wherein the notification indicates the at least one of: the at least one machine failure prediction, the at least one required maintenance time, and the at least one recommendation.

16. The system of claim 11, wherein the system is further configured to:
preprocess the monitored sensory inputs, wherein the preprocessing includes extracting at least one feature raw sensory data.

17. The system of claim 11, wherein the at least one machine failure prediction is a prediction of a future failure of the machine.

18. The system of claim 11, wherein the system is further configured to:
generate, based on the at least one indicator, an anomalies map.

19. The system of claim 11, wherein the system is further configured to:
generate, based on the running of the selected at least one unsupervised machine learning model, at least one normal behavior pattern.

\* \* \* \* \*